United States Patent
Anderson

(10) Patent No.: US 11,755,499 B2
(45) Date of Patent: Sep. 12, 2023

(54) LOCALLY-STORED REMOTE BLOCK DATA INTEGRITY

(71) Applicant: SECTURION SYSTEMS, INC., Centerville, UT (US)

(72) Inventor: Jordan Anderson, Centerville, UT (US)

(73) Assignee: SECTURION SYSTEMS, INC., Centerville, UT (US)

(*) Notice: Subject to any disclaimer, the term of this patent is extended or adjusted under 35 U.S.C. 154(b) by 733 days.

(21) Appl. No.: 16/417,839

(22) Filed: May 21, 2019

(65) Prior Publication Data
US 2020/0004695 A1    Jan. 2, 2020

Related U.S. Application Data

(60) Provisional application No. 62/678,595, filed on May 31, 2018.

(51) Int. Cl.
| | | |
|---|---|---|
| *G06F 16/13* | (2019.01) | |
| *G06F 16/17* | (2019.01) | |
| *H04L 9/40* | (2022.01) | |
| *G06F 12/14* | (2006.01) | |
| *H04L 9/32* | (2006.01) | |

(52) U.S. Cl.
CPC ........ *G06F 12/1408* (2013.01); *G06F 16/137* (2019.01); *G06F 16/1727* (2019.01); *H04L 9/3242* (2013.01); *H04L 9/3268* (2013.01); *H04L 63/166* (2013.01); *G06F 2212/1052* (2013.01)

(58) Field of Classification Search
CPC ............. G06F 12/1408; G06F 16/137; G06F 16/1727; G06F 2212/1052; H04L 9/3242; H04L 9/3268; H04L 63/166

USPC .......................................................... 713/151
See application file for complete search history.

(56) References Cited

U.S. PATENT DOCUMENTS

| | | | |
|---|---|---|---|
| 7,734,603 B1* | 6/2010 | McManis ................ | H03M 7/30 707/696 |
| 9,141,554 B1* | 9/2015 | Candelaria .......... | H03M 7/3091 |
| 9,165,155 B2 | 10/2015 | Druschel et al. | |
| 9,317,718 B1* | 4/2016 | Takahashi ................ | G06F 21/76 |
| 9,374,344 B1* | 6/2016 | Takahashi ................ | H04L 9/14 |
| 9,667,735 B2* | 5/2017 | Rubenstein .......... | H04L 67/2842 |

(Continued)

FOREIGN PATENT DOCUMENTS

| | | |
|---|---|---|
| CN | 108701076 | * 10/2018 |
| WO | 2018/024658 | 2/2018 |
| WO | 2019/231761 | 12/2019 |

OTHER PUBLICATIONS

Sravan Kumar R; Data Integrity Proofs in Cloud Storage; IEEE:2011; pp. 1-4.*

(Continued)

*Primary Examiner* — Monjur Rahim
(74) *Attorney, Agent, or Firm* — Greenberg Traurig LLP

(57) ABSTRACT

Systems and methods to securely store data in a remote storage (e.g., cloud storage or server). In one approach, a method includes: receiving, from a local device, data blocks to be stored; generating a hash from a hash of each data block; storing each respective hash (e.g., in a local or remote memory for later use); and writing the data blocks to remote storage. Data integrity is verified when each data block is read from the remote storage by generating a hash of the respective read data block, and comparing the generated hash to the respective stored hash.

22 Claims, 3 Drawing Sheets

(56) References Cited

U.S. PATENT DOCUMENTS

| | | | |
|---|---|---|---|
| 9,754,005 B2* | 9/2017 | Potter | G06F 16/128 |
| 9,794,064 B2 | 10/2017 | Anderson et al. | |
| 10,678,754 B1* | 6/2020 | Colgrove | G06F 16/1748 |
| 2009/0319772 A1* | 12/2009 | Singh | G06F 21/6218 |
| | | | 713/153 |
| 2010/0031000 A1* | 2/2010 | Flynn | G06F 16/9014 |
| | | | 711/216 |
| 2012/0110338 A1* | 5/2012 | Druschel | G06F 21/6218 |
| | | | 713/182 |
| 2013/0226888 A1* | 8/2013 | Govind | G06F 16/172 |
| | | | 707/698 |
| 2014/0156866 A1* | 6/2014 | Kallstrom | G06F 9/45533 |
| | | | 709/232 |
| 2014/0222772 A1* | 8/2014 | Peleg | G06F 3/065 |
| | | | 707/703 |
| 2016/0092137 A1* | 3/2016 | Doerk | G06F 16/00 |
| | | | 711/159 |
| 2016/0162686 A1* | 6/2016 | Nam | G06F 9/44589 |
| | | | 713/187 |
| 2017/0031599 A1* | 2/2017 | Bowman | G06F 3/0604 |
| 2017/0085372 A1* | 3/2017 | Anderson | H04L 9/08 |
| 2017/0315875 A1* | 11/2017 | Tirupati Nagaraj | |
| | | | G06F 16/2272 |
| 2017/0351457 A1* | 12/2017 | Usui | G06F 3/0641 |
| 2017/0359317 A1* | 12/2017 | Anderson | G06F 21/602 |
| 2018/0113767 A1* | 4/2018 | Pogosyan | G06F 16/27 |
| 2018/0321846 A1* | 11/2018 | Zhang | G06F 3/06 |
| 2019/0171847 A1* | 6/2019 | Schneider | G06F 3/067 |

OTHER PUBLICATIONS

Korean Intellectual Property Office; the International Search Report and the Written Opinion of the International Searching Authority, issued in connection to PCT/US2019/033309; dated Sep. 26, 2019; 12 pages; Korea.

* cited by examiner

LOCALLY-STORED REMOTE BLOCK DATA INTEGRITY

RELATED APPLICATIONS

This application claims priority to U.S. Provisional Application Ser. No. 62/678,595, filed May 31, 2018, entitled "LOCALLY-STORED REMOTE BLOCK DATA INTEGRITY," by JORDAN ANDERSON, the entire contents of which application is incorporated by reference as if fully set forth herein.

FIELD OF THE TECHNOLOGY

At least some embodiments disclosed herein relate to secure data storage in general.

BACKGROUND

An encryption appliance typically inserts inline into an existing network and encrypts full duplex data at, for example, multigigabit line speeds. This can reduce performance penalties imposed by, for example, encryption software running on a general-purpose server, and can allow encryption of data in flight to storage at local or remote locations.

Data can be stored remotely using various protocols. One example of a storage protocol is an Internet Small Computer Systems Interface (iSCSI), which is an Internet Protocol (IP)-based storage networking standard for linking data storage facilities. For example, iSCSI can be used to transmit data over local area networks (LANs), wide area networks (WANs), or the Internet and can enable location-independent data storage and retrieval. The iSCSI protocol can allow client devices to send, for example, SCSI commands to storage devices on remote servers. In one example, iSCSI is used as a storage area network protocol, allowing consolidation of storage into storage arrays for clients (e.g., database and web servers).

SUMMARY OF THE DESCRIPTION

Systems and methods to write data to remote storage, and to verify data integrity of data read back from the remote storage are described herein. Some embodiments are summarized in this section.

In one embodiment, a method includes: receiving, by at least one processor, a data block to be stored; generating a hash tag from a hash of the data block; storing the hash tag; and writing the data block to remote storage.

In one embodiment, the method further includes storing a data block identifier with the hash tag, where the data block identifier is associated with the stored data block. In one embodiment, the data block identifier is a block address provided by a file system of a local data device that provides the data block to be stored.

In one embodiment, the hash tag is stored in a local memory. In one embodiment, the remote storage is a first remote storage, and storing the hash tag comprises sending the hash tag over a network for storage in a second remote storage.

In one embodiment, the method further includes: reading the data block from the remote storage; generating a hash of the read data block; and comparing the generated hash to the stored hash tag.

In one embodiment, the stored hash tag is a keyed cryptographic hash tag. More specifically, a keyed hash tag for a data block is generated and stored using a cryptographic key; the data block is read from the remote storage; a keyed cryptographic hash of the read data block is generated using the same cryptographic key; and the generated keyed hash tag is compared to the stored keyed hash tag.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DESCRIPTION

Figure 1:
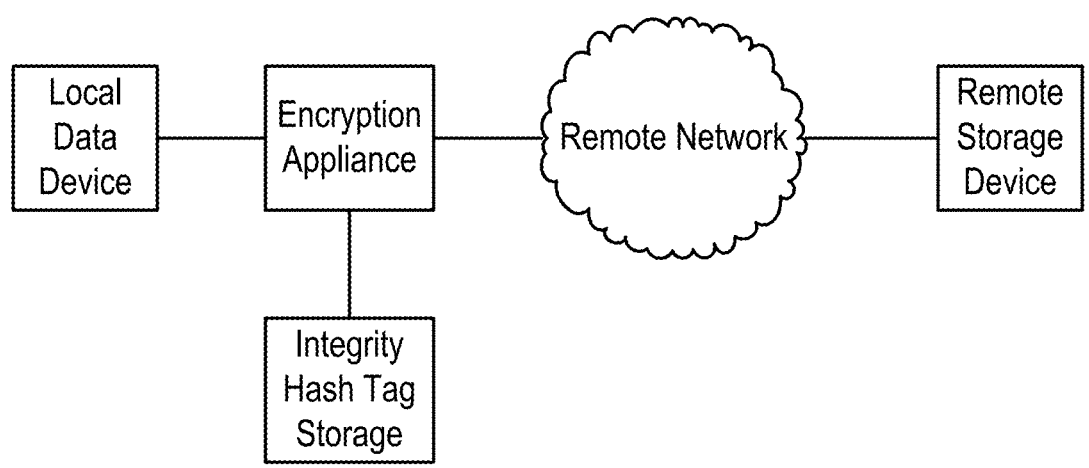
FIG. 1 shows a system for storing data blocks in a remote storage device, according to one embodiment.

The following description and drawings are illustrative and are not to be construed as limiting. Numerous specific details are described to provide a thorough understanding. However, in certain instances, well known or conventional details are not described in order to avoid obscuring the description. References to "one embodiment" or "an embodiment" in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present embodiments include the realization that the failure to maintain or confirm the integrity of stored data may indicate or be associated with a potential security breach of a computer system. The failure to detect a loss of data integrity may prevent taking protective or other measures that are appropriate for this type of situation (e.g., for protecting data against hackers or a further breach of security).

In particular, when storing block level data at a location out of the control of the owner of the data, traditional data integrity checking schemes cannot be applied. Traditionally, each block of data would have an integrity hash applied which can be retrieved at read time to validate data integrity. However, when storing data blocks on a remote storage device there is no way to store extra data associated with the data block (e.g., existing remote storage systems do not allow appending any extra data to the data block). This is because the storage protocol used to store data on a remote storage device defines the data block size and format and does not allow appending any extra data to the data block. This makes it difficult to verify the integrity of data blocks stored on a remote device.

The present embodiments include the realization that a method is desired to ensure that a data block retrieved from a remote storage device is an authentic copy of the data block that was written to the remote storage device. The present embodiments solve the remote storage data integrity problem above by using an encryption appliance to create and store an integrity hash tag for each data block written to a remote storage device. The encryption appliance can be, for example, a hardware device or software running on a local data device that can observe all data blocks being written out from the local data device's file system to a remote storage device or read back into the local data device from a remote storage device. An example of this is an encryption device that is encrypting and decrypting data blocks to or from a remote storage provider such as Amazon Web Services (AWS) and transmitting the data through an Internet Small Computer Systems Interface (iSCSI).

In one embodiment, a method for verifying the integrity of data blocks stored on a remote device is used on an iSCSI-based system or a system using another block storage protocol. The method can also be used on storage systems with self-encrypting drives.

In one embodiment, when a user system writes out a data block to a remote storage device, an encryption appliance creates and stores an integrity hash tag including a cryptographic hash of the data block and a data block identifier. When the data block is later retrieved from the remote storage device, the encryption appliance re-calculates the cryptographic hash, retrieves the stored cryptographic hash using the data block identifier, and then compares it with the re-calculated hash. If the two hashes match, then the integrity of the data block is verified.

Various embodiments herein provide the advantage of data integrity assurance when data is stored in a medium outside of a user's control. Existing solutions require a user's trust that a storage provider guarantees integrity. Various of the present embodiments provide a way to store data block integrity hash tags with a method to identify each data block in a look-up table that is independent of untrusted storage. For example, a data block can traverse or have been stored on any of one or more untrusted networks or devices. If the integrity hash that is re-calculated when the data block is read from a remote storage device matches the stored integrity hash (and is verified authentic), the data block is trusted to be valid.

In one embodiment, remote storage data integrity verification is enabled by using an encryption appliance to create an integrity hash tag from a cryptographic hash of a data block to be written from a local data device to a remote storage device and storing the integrity hash tag along with a data block identifier whenever a data block is remotely stored. When the data block is retrieved from storage, the cryptographic hash function is re-run on the data block and compared with the stored integrity hash tag associated with that data block identifier. If the hash tags match, the integrity of the data block is verified.

FIG. 1 shows a system for storing data blocks in a remote storage device, according to one embodiment. The data blocks to be stored are sent by a local data device to an encryption appliance. The encryption appliance calculates a hash for each of the data blocks to be stored. A data block identifier is associated with each hash and stored in an integrity hash tag storage. For example, the integrity hash tag storage can be a memory of the encryption appliance and/or a memory accessed over a remote network. The data blocks to be stored are sent over a remote network to the remote storage device.

In one embodiment, the stored integrity hash tag includes an authenticated cryptographic hash of the data block written to the remote storage device and a data block identifier. In one embodiment, the data block identifier is a block address provided by the file system running on the local data device.

In one embodiment, the integrity hash tags are stored in a look-up table. The integrity hash tag look-up table can be stored on any device or network. For example, it can be stored locally within the encryption appliance, within the local data device or another local user device, or it can be stored in a file opened by the local data device's file system on the remote storage device or some other remote server.

Also, the integrity hash tags can be stored in a trusted or untrusted location. A cloud or remote storage device is an example of an untrusted location. In some cases, even on-site storage may be untrusted. For example, a highly-classified user storing data on a general company storage device in some cases may not be trusted storage. In one embodiment, the integrity hash tag look-up table is stored in a trusted location.

In one embodiment, when a data block is retrieved from remote storage, a cryptographic hash is re-calculated and compared with the hash stored in the integrity hash tag associated with that data block identifier. If the hashes both match and are confirmed authentic, the data block integrity is verified and the data block can go through to the system.

In one embodiment, the integrity hash tags, which include cryptographic hashes for each block of data stored on a remote storage device, are stored locally on a local data device. When a data block is retrieved from remote storage, a cryptographic hash is re-calculated from the retrieved data block and compared with the locally stored hash associated with that data block identifier. The integrity hash tag storage area on, for example, the local data device has a storage size sufficiently large to store one integrity hash tag per each block that is to be stored on a remote storage device.

In one embodiment, the integrity hashes are stored locally using addressing directly related to the data block address, such that data blocks and their integrity hashes have a one-to-one relationship. When data is read back from remote storage, the local copy of the integrity hash is retrieved and compared to the computed integrity hash of the read data.

In one embodiment, the integrity hash tag is a keyed cryptographic hash tag. A keyed integrity hash tag for a data block is generated and stored using a cryptographic key. When a data block is retrieved from remote storage, a keyed cryptographic hash is re-calculated using the same key used to create the stored integrity hash tag and compared with the hash stored in the integrity hash tag associated with that data block identifier. If the hashes both match and are confirmed authentic, the data block integrity is verified.

In various embodiments, cryptographic hashes are either un-keyed, in which case anyone can produce the same hash (e.g., SHA256), or keyed, in which case one can only produce the hash if possessing the cryptographic key (e.g., HMAC). In one example scenario, the hash is stored in a trusted way. In another example scenario, the hash is stored in an untrusted way (e.g., untrusted storage using the second remote storage above). In either scenario, use of a keyed hash can provide a benefit. More particularly, use of a keyed hash provides an advantage when the hash is being stored in an untrusted way. This is so because use of the keyed hash protects stored hashes from tampering. For example, if a keyed hash is not used, an attacker might tamper with both the data and the corresponding hash to make the tampering undetectable. However, without the key, an attacker cannot tamper with the keyed hash.

Figure 2:
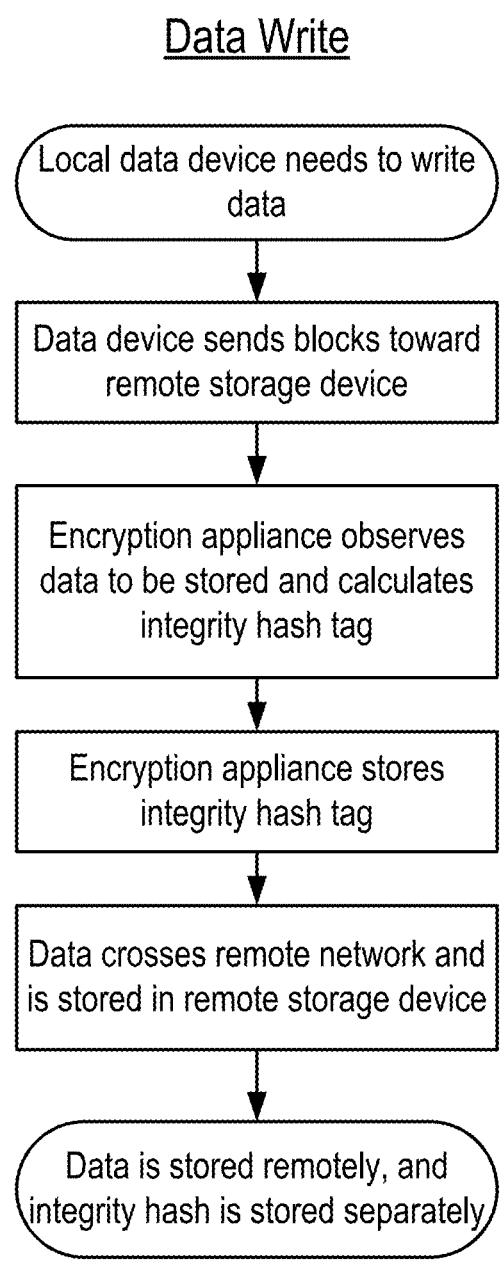
FIG. 2 shows a method for writing data to the remote storage device of FIG. 1, according to one embodiment.

FIG. 2 shows a method for writing data to the remote storage device of FIG. 1, according to one embodiment. In one example, the method is implemented using the encryption appliance of FIG. 1.

Figure 3:
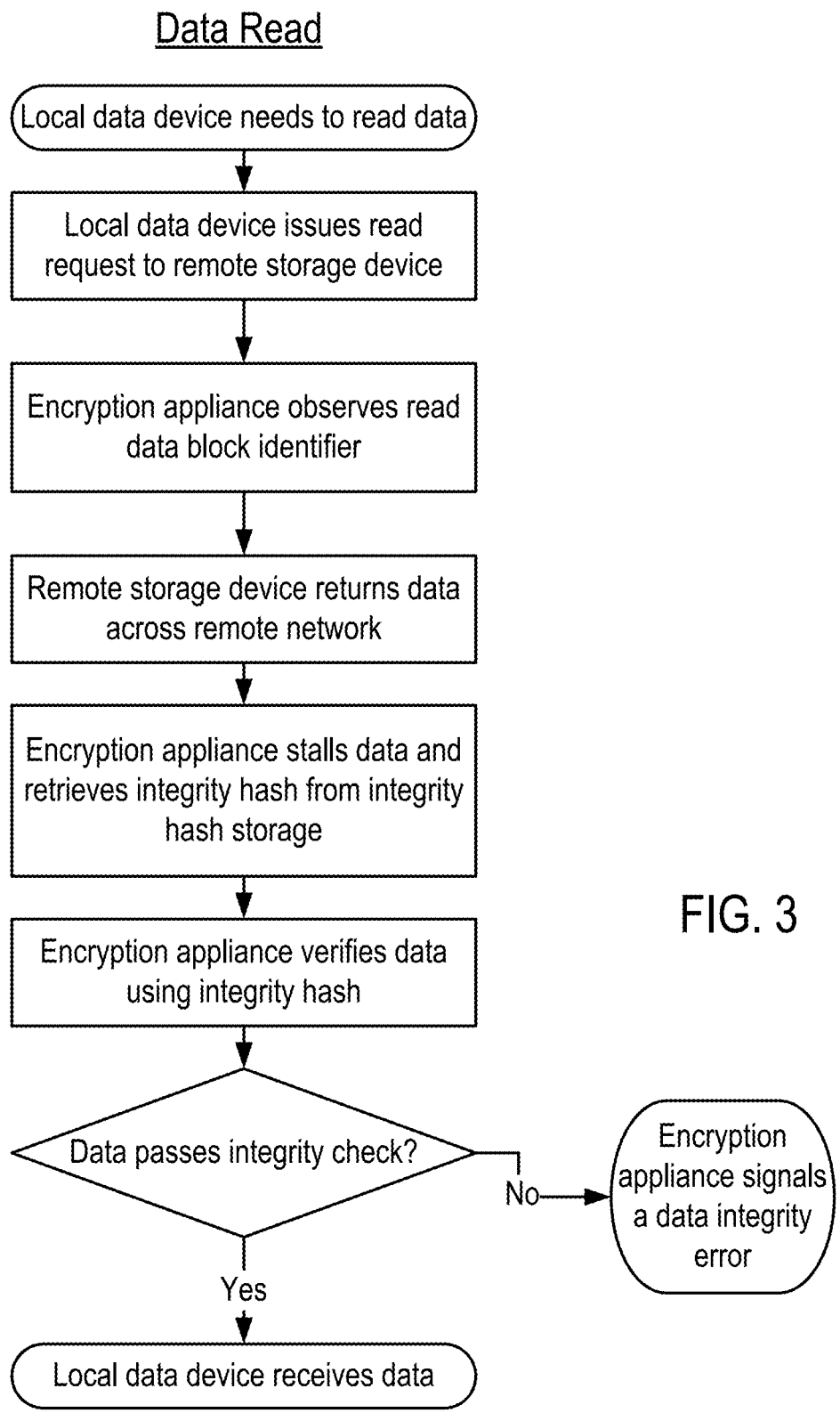
FIG. 3 shows a method for reading data from the remote storage device of FIG. 1, according to one embodiment.

FIG. 3 shows a method for reading data from the remote storage device of FIG. 1, according to one embodiment. In one example, the method is implemented using the encryption appliance of FIG. 1.

Various embodiments regarding writing and/or reading data are now described. In one embodiment, a method comprises: receiving, by at least one processor (e.g., a processor of an encryption appliance that includes FPGAs used to perform encryption processing), a data block to be stored; generating a hash tag from a hash of the data block; storing the hash tag; and writing the data block to remote storage (e.g., the remote storage device of FIG. 1).

In one embodiment, the method further comprises storing a data block identifier with the hash tag, wherein the data block identifier is associated with the stored data block.

In one embodiment, the data block identifier is a block address provided by a file system of a local data device that provides the data block to be stored.

In one embodiment, the hash tag is stored in a local memory (e.g., integrity hash tag storage of FIG. 1).

In one embodiment, the method further comprises: reading the data block from the remote storage; generating a hash of the read data block; and comparing the generated hash to the stored hash tag.

In one embodiment, the method further comprises determining, based on comparing the generated hash to the stored hash tag, whether the read data block is valid.

In one embodiment, the data block to be stored is received from a local data device (e.g., the local data device of FIG. 1), and the method further comprises, in response to determining the read data block is valid, sending the read data block to the local data device.

In one embodiment, the hash tag is generated by an encryption appliance (e.g., the encryption appliance of FIG. 1).

In one embodiment, the hash tag is stored in local memory of the encryption appliance.

In one embodiment, the remote storage is a first remote storage, and storing the hash tag comprises sending the hash tag over a network to a second remote storage to be stored in memory.

In one embodiment, comparing the generated hash to the stored hash tag comprises retrieving the hash tag from the second remote storage.

In one embodiment, a method comprises: generating a tag from a hash of a data block, wherein the data block is to be stored in a remote storage; storing the tag; and writing the data block to the remote storage.

In one embodiment, the method further comprises: reading the data block from the remote storage; generating a hash of the read data block; and comparing the generated hash to the tag.

In one embodiment, the tag is stored in a look-up table on a remote storage device.

In one embodiment, a system comprises: at least one processor; and memory storing instructions configured to instruct the at least one processor to: receive data from a local device; generate a hash tag from a hash of the data; store the hash tag; encrypt the received data to provide encrypted data; and send the encrypted data to a remote storage.

In one embodiment, the data received from the local device is a data block, and the instructions are further configured to instruct the at least one processor to: read the data block from the remote storage; generate a hash of the read data block; and compare the generated hash to the stored hash tag.

In one embodiment, the data received from the local device comprises a payload having a plurality of file objects.

In one embodiment, the instructions are further configured to instruct the at least one processor to set up a transport protocol using at least one certificate received from a certificate authority, wherein the at least one certificate is verified prior to establishing a connection to the local device using the transport protocol.

In one embodiment, the instructions are further configured to instruct the at least one processor to verify the identity of the cloud storage or server using the at least one certificate.

In one embodiment, the instructions are further configured to instruct the at least one processor to set up the transport protocol using at least one certificate received from the certificate authority, and to verify the identity of the remote storage, wherein the identity is verified prior to establishing a connection to the remote storage using the transport protocol.

In one embodiment, the instructions are further configured to instruct the at least one processor to: receive, from the remote storage, using a transport protocol, the encrypted data; decrypt, using a payload key, the encrypted data to provide decrypted data; and send, to the local device, using a transport protocol, the decrypted data.

In one embodiment, the instructions are further configured to instruct the at least one processor to verify the identity of the remote storage, the verifying including receiving at least one certificate from a certificate authority.

In one embodiment, the data received from the local device comprises packets including a first packet.

Variations on Remote Block Data Integrity

Various additional non-limiting embodiments and examples are now discussed below. In some embodiments, the encryption appliance above can be implemented by or use encryption/decryption and/or communication methods and systems as described in U.S. patent application Ser. No. 14/177,392, filed Feb. 11, 2014, entitled "SECURITY DEVICE WITH PROGRAMMABLE SYSTOLIC-MATRIX CRYPTOGRAPHIC MODULE AND PROGRAMMABLE INPUT/OUTPUT INTERFACE," by Richard J. Takahashi, and/or as described in U.S. patent application Ser. No. 14/219,651, filed Mar. 19, 2014, entitled "SECURE END-TO-END COMMUNICATION SYSTEM," by Richard J. Takahashi, and/or as described in U.S. patent application Ser. No. 15/688,743, filed Aug. 28, 2017, entitled "CLOUD STORAGE USING ENCRYPTION GATEWAY WITH CERTIFICATE AUTHORITY IDENTIFICATION," by Jordan Anderson et al. For example, the encryption appliance can use systolic matrix packet engines and multiplexers to process and route packets or other data, as described in the foregoing applications. In another example, the encryption gateway can be implemented using the encryption appliance above. In another example, the encryption gateway is used to determine data integrity for data blocks stored in a remote storage device (e.g., a cloud storage server).

In one embodiment, data to be stored in remote storage is encrypted by the encryption appliance at a file or file object level, and at least one key is associated to a file object. Examples of an executable file include a complete program that can be run directly by an operating system (e.g., in conjunction with shared libraries and system calls). The file generally contains a table of contents, a number of code blocks and data blocks, ancillary data such as the memory addresses at which different blocks should be loaded, which shared libraries are needed, the entry point address, and sometimes a symbol table for debugging. An operating system can run an executable file by loading blocks of code and data into memory at the indicated addresses and jumping to it.

Examples of a file object include code that is logically divided into multiple source files. Each source file is compiled independently into a corresponding object file of partially-formed machine code known as object code. At a later time these object files are linked together to form an executable file. Object files have several features in common with executable files (table of contents, blocks of machine instructions and data, and debugging information). However, the code is not ready to run. For example, it has incomplete references to subroutines outside itself, and as such, many of the machine instructions have only placeholder addresses.

In one embodiment, the encryption appliance sets up a transport session with the remote cloud storage or server prior to receiving a payload from the client (e.g., from an application executing on the client), and the encryption appliance uses the transport session for sending or writing data from a plurality of client applications, including the client application, to the remote cloud storage or server.

In one embodiment, data received from a client for writing to remote storage includes a payload having a plurality of file objects, and a payload key is associated to each of the file objects. The payload key can be derived using metadata or file header information, as was described above. In either case, the metadata or file header contains information that is used to derive the payload cipher key with a KEK. The metadata or file header is maintained with the file/object for the life of the file/object so that it can be used at any time to derive the payload cipher key to decrypt the file/object (e.g., when it is read from remote cloud storage).

In one embodiment, the data received from the client comprises packets including a first packet, and a header is inserted into one or more of the packets (e.g., the first packet), wherein the header associates each packet to the client. The file object may be split among multiple packets. In the first packet of a file, identifying information is stored that is used to extract the correct key for decryption when the file is later read (this provides key association with the data).

In one embodiment, the payload key is associated to the client or an object in the data received from the client. The payload key association is made through an identifying feature of the cloud server protocol associated with the cloud or remote server. In Amazon Web Services (AWS), for example, a specific "bucket" (e.g., like a folder) can have a key associated with it. The key to use is identified based on that information and uses that association.

Closing

At least some aspects disclosed can be embodied, at least in part, in software. That is, the techniques may be carried out in a computer system or other data processing system in response to its processor(s), such as a microprocessor, executing sequences of instructions contained in a memory, such as ROM, volatile RAM, non-volatile memory, cache or a remote storage device.

In various embodiments, hardwired circuitry (e.g., one or more hardware processors or other computing devices) may be used in combination with software instructions to implement the techniques above (e.g., the communication system may be implemented using one or more computing devices). Thus, the techniques are neither limited to any specific combination of hardware circuitry and software nor to any particular source for the instructions executed by the data processing system.

In one embodiment, a computing device may be used that comprises an inter-connect (e.g., bus and system core logic), which interconnects a microprocessor(s) and a memory. The microprocessor is coupled to cache memory in one example.

The inter-connect interconnects the microprocessor(s) and the memory together and also interconnects them to a display controller and display device and to peripheral devices such as input/output (I/O) devices through an input/output controller(s). Typical I/O devices include mice, keyboards, modems, network interfaces, printers, scanners, video cameras and other devices which are well known in the art.

The inter-connect may include one or more buses connected to one another through various bridges, controllers and/or adapters. In one embodiment the I/O controller includes a USB (Universal Serial Bus) adapter for controlling USB peripherals, and/or an IEEE-1394 bus adapter for controlling IEEE-1394 peripherals.

The memory may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a data processing system such as the computing device above is used to implement one or more of the following: an encryption gateway, a router, a switch, a key manager, a client application, cloud storage, a load balancer, and a firewall.

In one embodiment, a data processing system such as the computing device above is used to implement a user terminal, which may provide a user interface for control of a computing device. For example, a user interface may permit configuration of the encryption gateway. A user terminal may be in the form of a personal digital assistant (PDA), a cellular phone or other mobile device, a notebook computer or a personal desktop computer.

In some embodiments, one or more servers of the data processing system can be replaced with the service of a peer to peer network of a plurality of data processing systems, or a network of distributed computing systems. The peer to peer network, or a distributed computing system, can be collectively viewed as a server data processing system.

In one embodiment, a computing system is used that includes a processing device. The processing device can be, for example, a microprocessor, a graphics processing unit, a central processing unit (CPU), an FPGA, a processing core of a processor, an execution unit, etc. In one example, the processing device can be a single package that combines an FPGA and a microprocessor, in which the microprocessor does most of the processing, but passes off certain predetermined, specific tasks to an FPGA block. In one example, the processing device is a soft microprocessor (also sometimes called softcore microprocessor or a soft processor), which is a microprocessor core implemented using logic synthesis. The soft microprocessor can be implemented via different semiconductor devices containing programmable logic (e.g., ASIC, FPGA, or CPLD).

Embodiments of the disclosure can be implemented via the microprocessor(s) and/or the memory above. For example, the functionalities described can be partially implemented via hardware logic in the microprocessor(s) and partially using the instructions stored in the memory. Some embodiments are implemented using the microprocessor(s) without additional instructions stored in the memory. Some embodiments are implemented using the instructions stored in the memory for execution by one or more general purpose microprocessor(s). Thus, the disclosure is not limited to a specific configuration of hardware and/or software.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). For example, the encryption appliance can be implemented using one or more FPGAs.

Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Hardware and/or software may be used to implement the embodiments above. The software may be a sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

Software used in an embodiment may be stored in a machine readable medium. The executable software, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

In general, a tangible machine readable medium includes any mechanism that provides (e.g., stores) information in a form accessible by a machine (e.g., a computer, network device, personal digital assistant, manufacturing tool, any device with a set of one or more processors, etc.).

Although some of the drawings may illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that various stages or components could be implemented in hardware, firmware, software or any combination thereof.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

No claim element herein is to be construed under the provisions of 35 U.S.C. 112, sixth paragraph, unless the element is expressly recited using the phrase "means for."

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
reading a data block stored in a remote storage;
generating, using a predetermined key, a hash tag from a hash of the read data block;
observing an identifier of the read data block;
retrieving a stored hash tag associated with the read data block identifier, the stored hash tag being previously generated using the predetermined key;
comparing the generated hash tag with the stored hash tag, wherein a match between the generated hash tag and the stored hash tag indicates that the read data block is valid; and
sending the read data block to a local data device after determining that the read data block is valid through the hash tag comparison.

2. The method of claim 1, further comprising storing a data block identifier with a hash tag, wherein the data block identifier is associated with a data block stored in the remote storage.

3. The method of claim 2, wherein the data block identifier is a block address provided by a file system of a local data device that provides the data block to be stored.

4. The method of claim 2, wherein the hash tag is stored in a local memory.

5. The method of claim 1, further comprising:
receiving, by the local data device, a first data block;
generating, by the local data device, a first hash tag from a cryptographic hash and an identifier of the first data block;
storing the first hash tag in the local data device; and
writing the first data block to the remote storage.

6. The method of claim 1, wherein the hash tag is generated by an encryption appliance.

7. The method of claim 6, wherein the hash tag is stored in local memory of the encryption appliance.

8. The method of claim 6, wherein the remote storage is a first remote storage, and wherein storing the hash tag comprises sending the hash tag over a network to a second remote storage to be stored in memory.

9. The method of claim 8, wherein comparing the generated hash to the stored hash tag comprises retrieving the hash tag from the second remote storage.

10. A method, comprising:
generating, by a local data device using a predetermined key, a first hash tag from a cryptographic hash and an identifier of a data block received by the local data device;
storing the first hash tag in the local data device;
writing the data block to a remote storage;
reading the data block stored in the remote storage;
generating, using the predetermined key, a second hash tag from the read data block;
observing the identifier of the read data block;
retrieving the stored first hash tag using the identifier that is associated with the stored first hash tag;
comparing the second hash tag with the first hash tag, wherein a match between the first and second hash tag indicates that the read data block is valid; and
sending the read data block to the local data device after determining that the read data block is valid through the hash tag comparison.

11. The method of claim 10, wherein the remote storage is a first remote storage, and wherein storing the first hash tag comprises sending the first hash tag over a network to a second remote storage to be stored in memory.

12. The method of claim 10, wherein comparing the second hash tag with the first hash tag includes retrieving the first hash tag from a second remote storage.

13. A system, comprising:
at least one processing device; and
memory storing instructions configured to instruct the at least one processing device to:
read a data block stored in a remote storage;
generate, using a predetermined key, a hash tag from a hash of the read data block;
observe an identifier of the read data block;
retrieve a stored hash tag associated with the read data block identifier, the stored hash tag being previously generated using the predetermined key;
compare the generated hash tag with the stored hash tag, wherein a match between the generated hash tag and the stored hash tag indicates that the read data block is valid; and
send the read data block to a local device after determining that the read data block is valid through the hash tag comparison.

14. The system of claim 13, wherein the instructions are further configured to instruct the at least one processing device to:
receive, by the local device, a first data block;
generate, by the local device, a first hash tag from a cryptographic hash and an identifier of the first data block; and
write the first data block to the remote storage.

15. The system of claim 14, wherein the first data block comprises a payload having a plurality of file objects.

16. The system of claim 13, wherein the instructions are further configured to instruct the at least one processing device to set up a transport protocol using at least one certificate received from a certificate authority, wherein the at least one certificate is verified prior to establishing a connection to the local device using the transport protocol.

17. The system of claim 16, wherein the instructions are further configured to instruct the at least one processing device to verify the identity of the cloud storage or server using the at least one certificate.

18. The system of claim 16, wherein the instructions are further configured to instruct the at least one processing device to set up the transport protocol using at least one certificate received from the certificate authority, and to verify the identity of the remote storage, wherein the identity is verified prior to establishing a connection to the remote storage using the transport protocol.

19. The system of claim 13, wherein the instructions are further configured to instruct the at least one processing device to:
decrypt, using a payload key, the read data block to provide decrypted data; and
send, to the local device, using a transport protocol, the decrypted data.

20. The system of claim 13, wherein the instructions are further configured to instruct the at least one processing device to verify the identity of the remote storage, the verifying including receiving at least one certificate from a certificate authority.

21. The method of claim 1, wherein the stored hash tag is a keyed hash.

22. The method of claim 21, wherein the remote storage is a first remote storage, and wherein storing the hash tag comprises sending the keyed hash over a network to a second remote storage.

* * * * *